United States Patent [19]

Hodes et al.

[11] 4,308,321
[45] Dec. 29, 1981

[54] LAMINATED BEARING MATERIAL PRODUCED BY THERMOKINETIC PLATING

[75] Inventors: Erich Hodes, Rosbach; Danilo Sternisa, Emmendingen, both of Fed. Rep. of Germany

[73] Assignee: Glyco-Metall-Werke Daelen & Loos GmbH, Wiesbaden-Schierstein, Fed. Rep. of Germany

[21] Appl. No.: 73,734

[22] Filed: Sep. 10, 1979

Related U.S. Application Data

[63] Continuation-in-part of Ser. No. 851,472, Nov. 14, 1977, abandoned.

[30] Foreign Application Priority Data

Dec. 11, 1976 [DE] Fed. Rep. of Germany ....... 2656203
Apr. 9, 1977 [DE] Fed. Rep. of Germany ....... 2715914

[51] Int. Cl.³ .......................... B32B 3/00; C23C 7/00; B32B 15/18; B32B 15/20
[52] U.S. Cl. .................................. 428/612; 428/613; 428/647; 428/648; 428/653; 428/676; 428/679; 308/DIG. 5; 308/DIG. 8; 252/12
[58] Field of Search .................... 428/613, 645–648, 428/652–653, 676–677, 679, 937, 941, 612; 308/DIG. 5, DIG. 8; 252/12

[56] References Cited

U.S. PATENT DOCUMENTS

| 2,178,149 | 10/1939 | Strickland | 428/937 |
|---|---|---|---|
| 2,424,557 | 7/1947 | Bra | 428/677 |
| 2,525,887 | 10/1950 | Frazier et al. | 428/941 |
| 2,765,520 | 10/1956 | Donley | 428/941 |
| 2,833,667 | 5/1958 | Dalton | 428/937 |
| 2,977,673 | 4/1961 | Weinman | 428/677 |
| 3,004,333 | 10/1961 | Schaefer | 428/677 |
| 3,147,087 | 9/1964 | Eisenlohr | 428/613 |
| 3,150,940 | 9/1964 | Graves | 428/937 |
| 3,285,680 | 11/1966 | Dailey | 428/937 |
| 3,350,773 | 11/1967 | Beebe, Jr. et al. | 428/679 |
| 3,376,119 | 4/1968 | Bruns et al. | 428/613 |
| 3,403,010 | 9/1968 | MacDonald et al. | 428/677 |
| 3,505,104 | 4/1970 | Ingerson | 428/941 |
| 3,553,806 | 1/1971 | Turk et al. | 428/677 |
| 3,623,205 | 11/1971 | Scott | 428/941 |
| 3,788,823 | 1/1974 | Wells | 428/613 |

Primary Examiner—Delbert E. Gantz
Assistant Examiner—Donald R. Valentine
Attorney, Agent, or Firm—H. Gibner Lehmann; K. Gibner Lehmann

[57] ABSTRACT

A bearing laminate and method of producing the same, wherein a metallic suspension alloy having a tendency to dissociate is thermokinetically applied as a coating to a substrate, such coating in its solid state becoming dissociated. The substrate and the applied coating are mechanically compressed after the application and solidification of the latter. The surface of the substrate which receives the suspension alloy coating is especially prepared, either as a rough surfaced base or else as an aluminum or aluminum alloy surface having a surface activation and grain structure that is produced by a brief heating to a temperature between 450° and the melting point of the aluminum or aluminum alloy, such heating destroying and removing the aluminum oxide.

24 Claims, 10 Drawing Figures

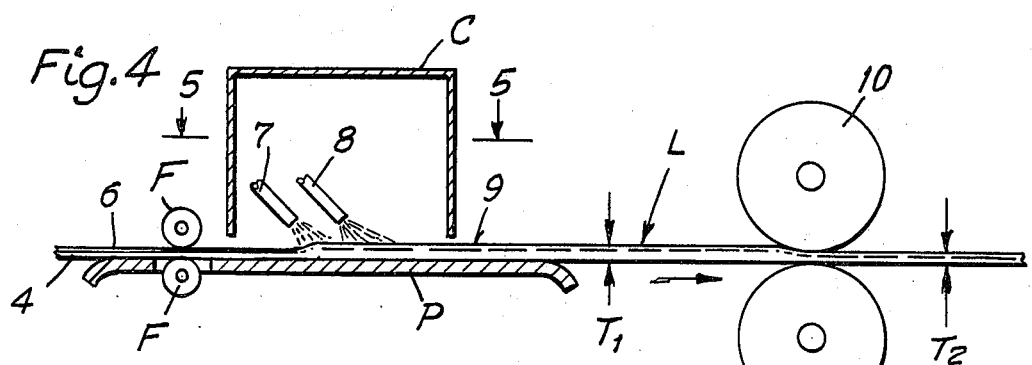
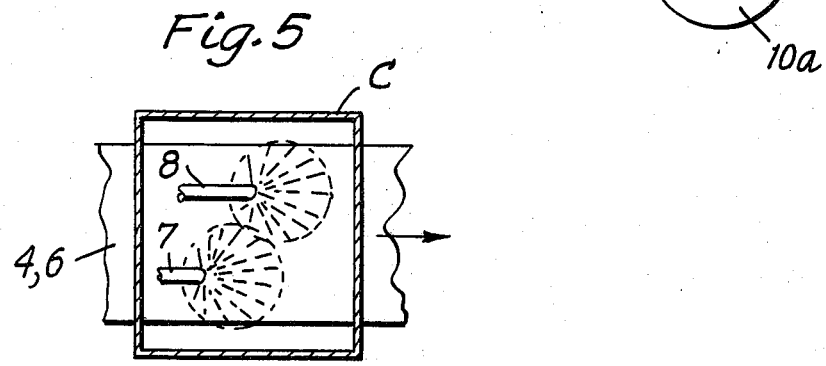
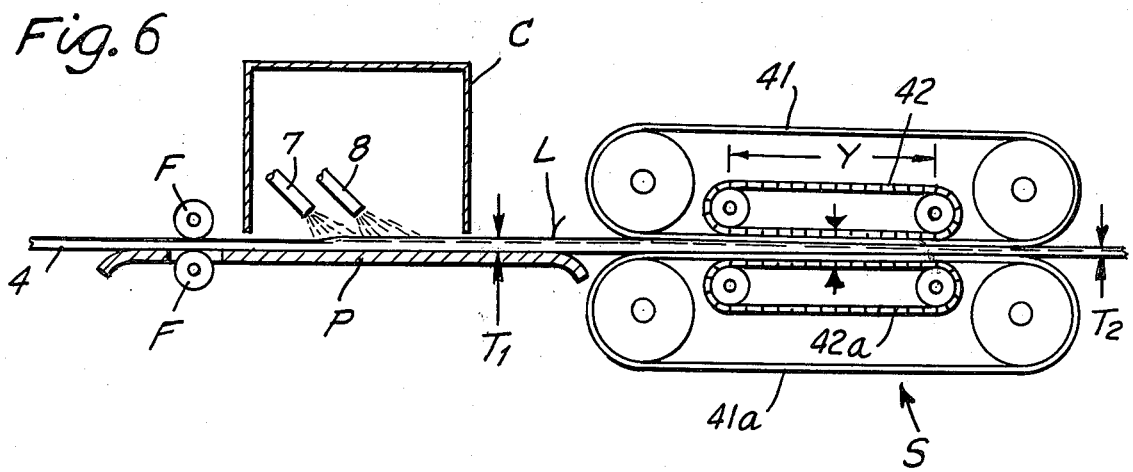
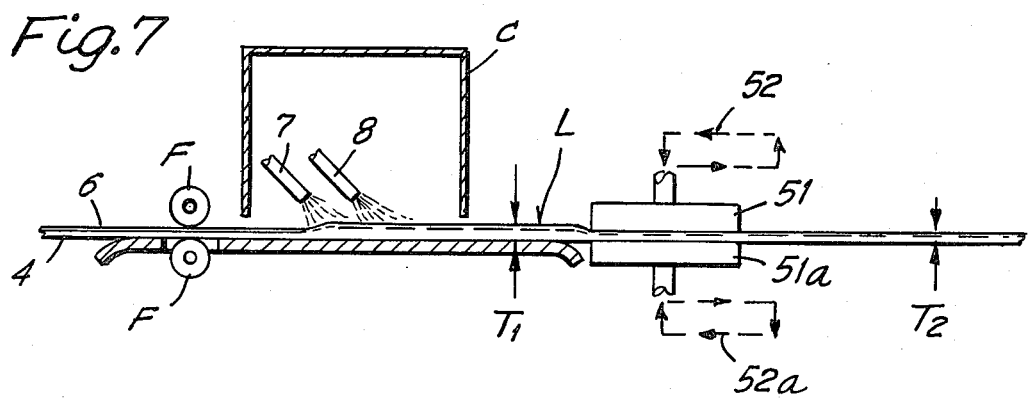

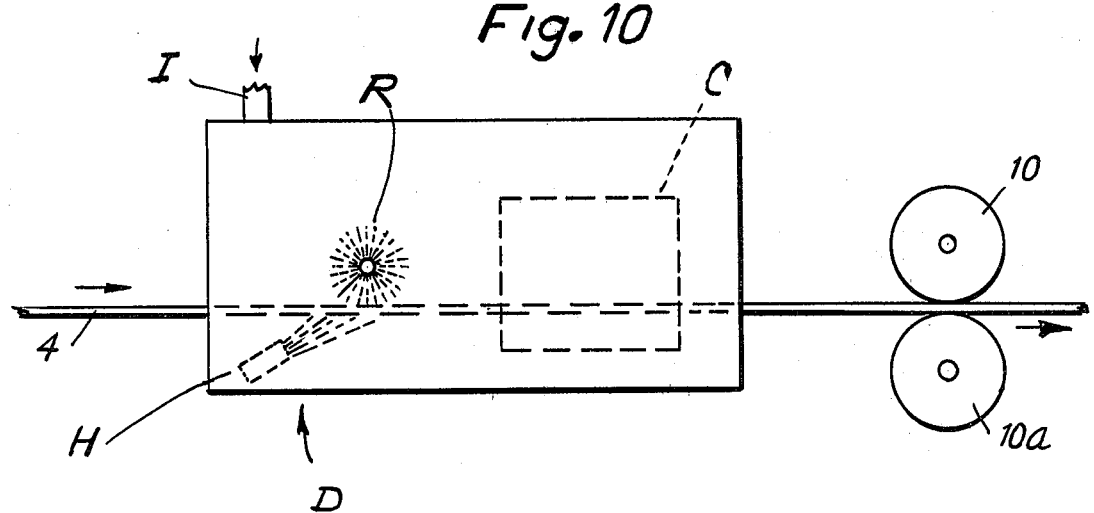

LAMINATED BEARING MATERIAL PRODUCED BY THERMOKINETIC PLATING

This application is a continuation-in-part of our co-pending application having the same title, filed on Nov. 14, 1977 under Ser. No. 851,472 which is about to become abandoned for lack of prosecution.

CROSS REFERENCES TO RELATED APPLICATIONS

1. Co-pending U.S. application Ser. No. 850,159, filed on Nov. 10, 1977, now U.S. Pat. No. 4,263,361, in the names of Erich Hodes and Danilo Sternisa, entitled LAMINATED MATERIAL FOR THE PRODUCTION OF PLAIN BEARING ELEMENTS AND METHOD FOR ITS PRODUCTION.

2. Co-pending U.S. application Ser. No. 851,398, filed on Nov. 14, 1977, in the name of Erich Roemer, entitled WHITE METAL BEARING ALLOY OF LEAD, TIN AND COPPER FOR PLAIN BEARING LAMINATES.

3. Two co-pending German applications of Erich Hodes and Danilo Sternisa, each entitled SCHICHTWERKSTOFF UNDVERFAHREN ZU SEINER HERSTELLUNG MITTELS THERMOKINETISCHEN PLATTIERENS, respectively German Ser. No. P 26 56 203.8 filed in Germany on Dec. 11, 1976, and German Ser. No. P 27 15 914.4 filed in Germany on Apr. 9, 1977, on which applications a priority claim is hereby made, pursuant to Section 119 of the Patent Act of 1952.

BACKGROUND

The invention relates to laminated materials comprising a substrate having metallic suspension coatings, and more particularly to materials of this type as used for the production of plain bearing elements.

A prior method for the production of laminated materials as known by German Offenlegungsschrift No. 19 23 030 provides for the preheating of a cleaned, roughened steel base strip. Then an intermediate NiAl layer is applied, whereupon AlSn wire in the form of a melting compound is fused and sprayed on, the sprayed surface being rolled and the composite article subjected to a heat treatment for about 1 hour at 300° to 350°.

However, the above described method for the production of laminated materials using highly adhesive intermediate layers comprising molybdenum and nickel aluminide has the disadvantage that it cannot be subjected to concentrated loads, impact, milling or rolling operations because of the likelihood of separation of the coating from the substrate, making the parts useless.

The German Disclosure reference No. DT-OS No. 23 60 523 describes a method for the production of a laminated material by spraying a metal layer onto a substrate of aluminum or an aluminum alloy. The oxide film on the substrate surface is counteracted by an adequate adhesion to the sprayed-on metal coating, but this has the effect that the sprayed-on metal layer tends to peel off. To avoid this disadvantage it is suggested in the disclosure to spray on a thin intermediate layer of a highly adhesive material such as NiAl or Mo.

The disadvantage of this method as set forth immediately above is that the materials which are sprayed on, are applied over the oxide film of the substrate material, and therefore the bond is likewise not sufficient to withstand the above mentioned loads.

The German Disclosure reference No. DT-OS No. 23 60 523 also describes a method to eliminate the automatically or ever-present oxide film of the substrate material. Zinc is substituted in or precipitated on the surface, and the desired materials are then sprayed in layers onto this zinc coating.

Due to the time-consuming and difficult nature of this pretreatment, the method which it utilizes does not represent an economical solution for the production of laminated bearing materials either, because it is applicable only to parts which undergo no further deformation, and is not suited for a continuous manufacturing operation.

German Auslegeschrift (Provisional Patent) No. 2,130,421 describes a method for the production of laminate material by dropping a molten mixture of aluminum and lead onto the surface of a substrate strip. Such dropping may be free falling down, or may be accelerated by downwardly directed streams of inert gases.

For better adhesion between a steel base and a coating alloy, the German Provisional Pat. No. 2,130,421 proposes to apply, prior to the actual spraying, either by immersion in aluminum or in an aluminum alloy, or else by the application of a suitable powder, or by spraying-on a very thin Al film, a metal coating which is compatible with the actual, later-applied coating alloy and which does not form a thick, brittle intermediate layer with the steel.

German Disclosure reference No. DT-OS 17 75 322 explains a method for the production of laminated steel AlPb material for the manufacture of plain bearings. In this known method, initially a so-called "green strip" is produced as a semi-product by rolling together a middle stream of AlPb powder and outer streams of aluminum powder to form a strip of three layers of different composition. Thereafter, this "green strip" is plated onto one surface of a substrate strip by rolling. The disadvantage of this method is that due to the inevitable intermixing which occurs when the layered powder is running into the rolling gap, the three layers are not distinctly separated. Due to the subsequent sintering and rolling operation required in this method, uncontrollable diffusion processes take place on the one hand which lead to the formation of brittle phases that impair the bond. On the other hand, due to severe deformation, the somewhat round Pb particles become elongated with the result that failures of plain bearing elements made of such laminated materials will occur because of the internal notch effect as the Pb fibers are stressed to the endurance limit.

The fact that all such prior coatings still have quite substantial deficiencies is known ["Jahrbuch der Oberflaechentechnik" (Yearbook of Surface Engineering) 1956, pages 261/306]. The significant disadvantage thus is that, in addition to the necessity for producing intermediate layers for a better bond, an additional thermal after-treatment must be carried out, and that in spite of this the coating still will peel off or partly chip off, when producing the workpieces. It is believed that this peeling or chipping can be attributed in part to the formation of brittle, inter-metallic phases.

In view of this, it is an object of the present invention to provide an improved laminated material comprising a substrate and a coating of metallic suspension alloy, that is characterized by a high bonding strength and also good deformability, so as to make it possible to produce, from such laminated material, various workpieces and in particular plain bearing elements, without additional thermal treatment such as sintering. Moreover, the invention has for another object the provision of favorable production methods for the manufacture of such laminated materials.

According to the invention there is provided, in order to solve this problem, a method and product characterized by a coating that starts as an alloy which has a tendency to dissociate whereby upon cooling from the molten state it becomes a suspension or mixture (often referred to as a "suspension alloy"). This coating substance or alloy is applied thermokinetically to a substrate as a molten alloy that tends to dissociate, and upon its solidification the components dissociate and become chemically separate. The coating is then compressed together with the substrate; in accordance with the invention the substrate surface that receives the suspension alloy is in the form of either a rough base, or else an aluminum or aluminum alloy surface characterized by a surface activation and grain structure (de-oxidization) that is produced by brief heating to a temperature between 450° C. and the melting point of the aluminum or aluminum alloy, this being preferably accomplished by the thermokinetic coating procedure.

Some embodiment examples of the invention are described below in greater detail with reference to the drawings, in which:

FIG. 4 is a schematic representation of an apparatus for continuously producing laminate material according to the invention;

FIG. 5 is a fragmentary horizontal section, taken on line 8—8 of FIG. 4;

FIG. 6 is a representation somewhat like that in FIG. 4, of an apparatus to continuously produce laminated material, such apparatus employing a known SANDVIK conveyor machine with a continuous pressure device;

FIG. 7 is a schematic representation of a continuous apparatus, having a different-type pressure device;

FIG. 10 is a schematic representation of a continuous apparatus employing the plasma spray of FIG. 4 in a de-oxidizing furnace having an inert atmosphere.

As used herein, the term "suspension alloy" signifies a substance which, when in the molten state, can exhibit a chemical combining of the component materials but has a tendency to effect a chemical separation of such materials whereby the solidified condition of the substance will show that the materials are dissociated or chemically separate even though they remain physically bound together. That is, the component materials are substantially antisoluble with respect to each other in the temperature range where they exist in the solid state, i.e. where the bearing coating exists as a solid after having been deposited by the thermokinetic plating.

Such component materials as aluminum and lead fall into this category. The invention utilizes such a suspension alloy substance in the following manner: When it contains aluminum and is sprayed in molten condition at a given high temperature on an aluminum surface, the oxide on the latter can be destroyed and removed and a strong aluminum-to-aluminum bond effected between the substrate and the alloy substance. The aluminum surface, in another version of the invention, can be de-oxidized prior to the spraying-on of the alloy substance. Alternatively, when the alloy substance is sprayed onto a roughened surface and subsequently compressed against the same, aluminum particles of the solidified substance are more intimately forced into the interstices of the roughened surface to effect a strong bond to the substrate.

EXAMPLE I

Figure 1:
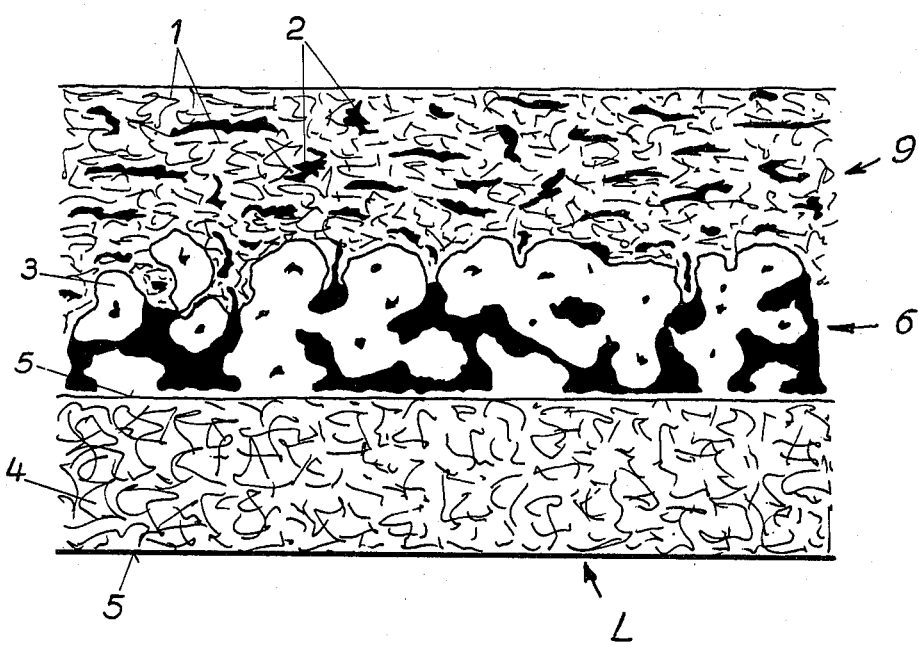
FIG. 1 is an enlarged section of a laminated material according to the invention, having a solid substrate and a rough base.

A composite bearing strip or laminate indicated generally by the letter L, comprises a flexible steel band or substrate member 4, which is copper-plated on both sides at 5 (FIGS. 1 and 4) and is provided on one side with a rough porous base in the form of a sinter skeleton 6 formed of essentially spherical, tin-bronze powder particles. To the rough base thus obtained is applied by thermokinetic application such as flame spraying, arc spraying, or plasma spraying, with guns 7 and 8, a metallic suspension alloy in the form of an aluminum and lead alloy coating 9. The sinter skeleton 6 constitutes an interface which has a permanently roughened zone (its upper face as viewed in FIG. 1) that presents interstices to the alloy coating 9 as the latter is sprayed on. As seen in FIG. 1 the interface 6 is disposed between the substrate 4 and the bearing coating 9. The numeral 1, in the drawing represents essentially the aluminum suspension particles, and the numeral 2 the lead particles. The band or compound material thus formed is compressed by rolling, using rollers 10 and 10a, reducing its thickness from $T_1$ to $T_2$ by approximately 12%. The rollers 10 and 10a cause the coating 9 to be formed into a solid bearing laminate, constituted as a solid suspension of different metallic components (the aluminum and lead) which are chemically dissociated in the coating with respect to each other. It will be seen that the pressing by the rollers 10 and 10a has caused both the aluminum particles 1 and the lead particles 2 to more intimately contact the interface 6 in the interstices which the latter presents, whereby the bond is extremely effective. During the spraying, the band 4 is supported and guided by a platform P, having feed rollers F, F.

The spacing between the spray guns 7, 8 and the substrate can be 170 mm±10 mm where the substrate which is to be coated contains aluminum that is to be heated by the guns to effect a surface activation whereby the oxide is destroyed and removed. An inert atmosphere can be provided in the housing C.

FIG. 10 shows the apparatus of FIG. 4 incorporated in a de-oxidizing furnace D having a rotary wire brush R, a flame heater H and an inert gas supply I, by which the strip 4 has the aluminum oxide coating destroyed and removed. With this arrangement, the strip 4 is preheated and has its aluminum surface activated before reaching the guns 7 and 8. The arrangement of FIG. 10 is a supplemental method of effecting the de-oxidizing, using the heat of the flame nozzle H and the abrasion of the wire brush R. As described above, however, the nozzles 7 and 8 can do the de-oxidizing in addition to applying the coating. If the substrate surface is the sintered copper material, then the spacing of the guns 7, 8 from the substrate surface can be 210 mm ± 10 mm. The laminate as above formed therefore has an interface portion 6 between the substrate 4 and the coating 9. Such interface portion 6 can be of sintered copper material, the latter being either rolled on the substrate or else thermokinetically applied as by a spraying process. A housing C encloses the guns 7 and 8 and protects personnel, as well as excluding air streams. Refer also to FIG. 5.

EXAMPLE II

The manufacturing method of a similar laminated material, essentially differing from FIG. 1 only in that a steel band not copper-plated is used as a basis, is described in the following example:

A steel band that is not copper-plated, having a tin-bronze sinter skeleton and an overall thickness of 1.7 mm, is led past a spraying device and subsequently compressed by a rolling operation.

The substrate comprises a steel formulation according to DIN 1623, 1.5 mm thick. The sinter skeleton forming the porous rough base has a preferred composition CuSn 10 and a thickness of 0.2 mm. The AlPb mixture consists of 80 percent by weight of aluminum and 20 percent by weight of lead. The aluminum component comprises a powder of spherical particle shape, with a grain size range from 40 to 60 microns and with the alloying elements Si and Fe. The second mixture component present is PbSn with 1% Sn, likewise in spherical particle shape, having a grain size range wholly between 80 and 100 microns.

$H_2O_2$ is the fuel-gas mixture used. In addition, a spray nozzle unit to limit the flame cone is used.

The band is continuously led at a specified band speed of 1 m/min. past the spraying device, as in FIG. 4, to which the AlPb mixture is fed. At the present spray data, an AlPb slide surface thickness of 0.4 mm is obtained.

A compaction by rolling follows the spraying operation. The degree of deformation relative to a total thickness of 0.1 mm is 14%, corresponding to a 1.8 mm final thickness of the finished laminate.

EXAMPLE III

Figure 2:
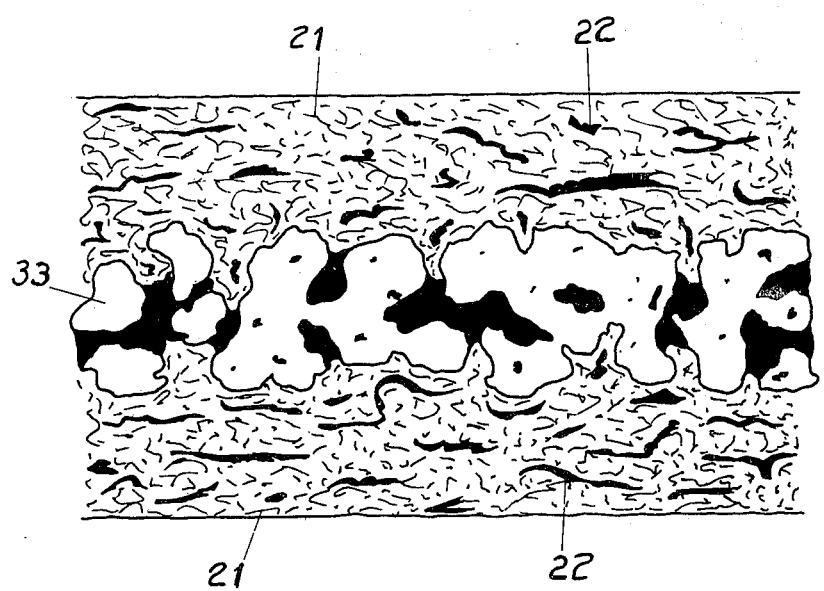
FIG. 2 is an enlarged section of a laminated material according to the invention, having a sinter skeleton as a self-supporting substrate and a rough base.

FIG. 2 shows a third example in which a tin-bronze sintered body 33 in self-supporting layer form is pre-produced in a thickness of, say 0.5 mm. Preferably the make-up would be from essentially spherical particles. This band of sinter skeleton 33 is coated on both sides with a suspension alloy of 80 percent by weight of aluminum and 20 percent by weight of lead, by thermokinetic plating such as flame spraying, arc spraying or plasma spraying, the aluminum components being represented by the numeral 21 and the lead components by the numeral 22 in FIG. 2. The suspension alloy material intended for the coating operation can correspond to that in the above Example II, for instance. After the thermokinetic plating, the laminated band is compressed, reducing its thickness by about 14%.

EXAMPLE IV

Figure 3:
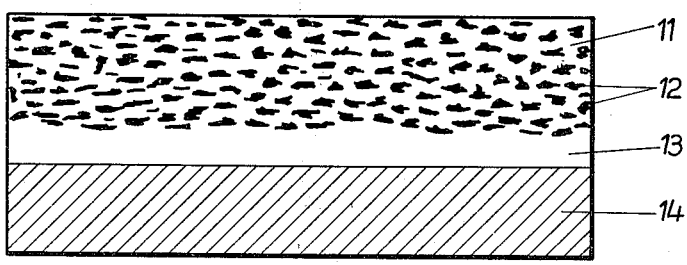
FIG. 3 is an enlarged section of a laminated material according to the invention, having aluminum-plated steel as a base layer and AlPb as the suspension-alloy coating.

A steel band 14 (FIG. 3) has on one side a rolled-on interface in the form of an aluminum layer 13. After pre-heating this assemblage in a protective gas atmosphere in a continuous furnace as seen in FIG. 10 so as to de-oxidize the aluminum surface in a zone of large area and produce a surface activation with altered, non-oxidized grain structure, an aluminum and lead suspension alloy is applied to form a slide-bearing coating on the thus-created and activated zone of the base layer, this being effected by thermokinetic application such as flame spraying, arc spraying, plasma spraying or blast spraying, the drawing showing at 11 essentially the aluminum particles and at 12 the lead particles which are now chemically dissociated in the bearing coating. The compound material thus formed is compressed by rolling, reducing its thickness by about 14%. The substrate used is a steel formulation according to DIN 1623, 1.5 mm thick. The thickness of the rolled-on Al 99.5 or Al 99.0 intermediate aluminum layer 13 which has the zone of de-oxidized activation at its top as viewed in FIG. 3, is 0.2 mm. The AlPb mixture consists of 80 percent by weight of aluminum and 20 percent by weight of lead. The aluminum component used is a powder of spherical particle shape with a grain size range from 40 to 60 microns and having the alloying elements Si and Fe. PbSn containing 1% Sn, likewise with particles of spherical shape, is present as the second mixture component. 100% of its particles are in the grain size range between 80 and 100 microns.

$H_2O_2$ is used as the fuel-gas mixture. In addition, a spray nozzle unit is used to limit the flame cone. At a specified band speed of 1 m/min, the band, preheated in the protective gas atmosphere of the continuous furnace at a temperature above 450° C. and below the melting point of the aluminum, is continuously led past the spraying device to which the AlPb mixture is fed. An AlPb slide surface thickness of 0.4 mm is obtained with the present spraying data. Following the coating operation, the band is compacted by rolling after previous cooling in the same pass. The degree of deformation is 14%, relative to a total thickness of 2.1 mm, which corresponds to a final thickness of 1.8 mm of the finished laminate. The compaction of the band forces some of the aluminum particles 11 into a strong bonding relationship with the de-oxidized surface of the aluminum interface 13, stoutly preventing separation.

EXAMPLE V

An Al 99.0 band 0.5 mm thick is coated on both sides with a suspension alloy of 80 percent by weight of aluminum and 20 percent by weight of lead, by thermokinetic plating such as flame spraying, plasma spraying or blast spraying under operating conditions similar to those in Example IV. The suspension alloy material intended for the coating can correspond to that of Example IV, for instance. After the thermokinetic plating operation, the laminate in band form is compressed, reducing its thickness by about 14%.

Basically, the production of porous metal layers in the form of a rough base, to bond third layers to solid steel carriers is known [see Metall (Germany), vol. 29, June 1975, No. 6, pages 581/5]. To date, such a rough base has been impregnated with molten lead or molten white metal by the lining method (see U.S. Pat. Nos. 2,189,253 and 2,198,240). However, the disadvantage of this laminated material is that crack formation is severe when stamping cups or lubricating grooves, this being attributable to the great accumulation of lead in the sinter skeleton. In contrast thereto the invention offers the advantage that the suspension alloy is applied to the rough base thermokinetically and tends to dissociate, thereby resulting in chemically separate lead and aluminum particles which give a much better bond and structure in the coating than has been possible so far.

For instance, the lead content in lead-containing suspension alloys such as Cu+Pb and Al+Pb when applied thermokinetically to a rough base in accordance with the invention is present in a very finely divided state in the metallic matrix, thus preventing with certainty the crack formation described.

If the rough base is in the form of an intermediate layer, the latter should be such, in the most favorable case, that the subsequently applied suspension alloy which tends to dissociate is bonded exclusively to the rough base. The thickness of such a rough base when provided in the form of an intermediate layer, should range from 0.05 mm to 0.3 mm, preferably 0.2 mm.

Within the scope of the invention, the rough base may be a porous intermediate layer in the form of a porous sinter skeleton consisiting of copper-containing material such as brass or bronze, preferably stannous bronze with 90 percent by weight of Cu and 10 percent by weight of Sn. The sinter particles of such a rough base, which is in the form of a sinter skeleton, should preferably be spherical because this shape assures a better bond and better deformability than sharp-cornered sinter grains. The stannous bronze particles are preferably sintered to an electrocopper plated substrate to improve the bond. If a sharp-cornered sinter skeleton is used, such as in thick substrate materials, the electrodeposited intermediate layer can be omitted. The back side of the substrate can, moreover, be provided with electro-deposited layers.

Due to the spherical shape of the sinter particles and the resultant large surface, the thermal conditions for the spraying operation are so favorable that, as was found, a distinct diffusion zone such as of copper in aluminum with partial fusion of the AlPb particles to the porous intermediate layer is formed, which extends over the entire cross-section of the material and which may be the explanation for the excellent bond and loading capacity that is obtained.

Therefore, a particularly advantageous embodiment of the invention uses as an intermediate section a porous layer such as of stannous bronze (CuSn 10). Due to the grain shape of the intermediate layer and the material thereof, together with the flame spray data specified, this embodiment of the invention results in an outstanding bond.

Contrary to the view often expressed in the related literature, this outstanding bond is based on a distinct diffusion layer and a fusion of the components of the plain bearing material to the rough base.

Since the metallic reactions between the spray material and the rough base material which are responsible for the bond are more numerous with a higher interface temperature, this temperature is of particular significance. However, the possibility of improving the spray coating bond by increasing the workpiece surface temperature is limited by the automatic oxidation.

In addition, the use of a porous stannous bronze sinter layer has the advantage of achieving excellent compression strength. Furthermore, the sinter skeleton assures excellent dissipation of the friction heat.

The metal carrier-sinter skeleton can be advantageously preheated before spraying. The preheating temperature can range from 100° to 500° C.

The suspension alloy, heated to a high temperature in a gas flow and tending to dissociate, can consist for example, of an AlPb mix. The aluminum used can be an aluminum alloy containing Si, Cu, Fe, Mg as alloying ingredients, for instance. The second component, namely lead, may contain tin as an alloying ingredient.

Heated to high temperatures are those components of the mechanical AlPb mix, or of the pre-alloyed powder, which are transformed into plastic or molten state by the supply of heat energy. The molten material is finely divided by the carrier gas flow and is carried along by the gas at great velocity. After impinging on the porous intermediate layer, the finely divided molten spray particles experience rapid cooling.

Within the scope of the invention, the AlPb mix or the pre-alloyed powder used for the spraying operation can consist, for example, of approximately 20 percent by weight of lead and 80 percent by weight of aluminum.

The invention, however, is not restricted to this composition, but embraces also other mixing ratios and other alloy compositions without there being the danger that the coatings will not have the excellent bonding characteristics when the spraying conditions are modified accordingly and appropriately.

To produce the improved laminated material, the invention provides a method, characterized in that a porous layer is formed to constitute a rough base, be it self-supporting or a unilateral or bilateral coating on a carrier workpiece or substrate, and that thereafter a metallic suspension alloy which tends to dissociate is applied to this rough base by a thermokinetic plating process after which the laminated material thus formed is mechanically compacted by the application of pressure. If it is intended to apply the rough base to a substrate material in the form of an intermediate layer, this can be done within the scope of the invention by sintering copper material such as brass or bronze powder, preferably stannous bronze with 90 percent copper and 10 percent by weight tin, to the substrate, forming a porous sinter skeleton. The brass or bronze powder used to produce such a porous sinter skeleton should be essentially of spherical grain shape, if possible. The shape of the particles of the mix or pre-alloy to be used within the scope of the invention for the thermo-kinetic plating operation should likewise preferably be spherical. Such a spherical particle shape should be given preference over particles of sharp-cornered or elongated shape. The percentage of particles other than spherical in shape in an aluminum-lead mixture, for instance, should not exceed 20%, if possible.

It is known that a part of the spray material such as aluminum or lead evaporates at the high temperatures prevailing in the flame spray jet, because the metallic spray particles are usually present in various sizes. The consequence of these particle size differences is that the smaller particles heat up faster due to the fact that, as is known, the surface of the particles decreases with the square, while their mass decreases with the third power of their size. Accordingly, smaller particles evaporate faster, becoming even smaller.

It is therefore recommended within the scope of the invention to select the aluminum grain size smaller than 60 microns, preferably between 40 and 60 microns, when processing AlPb mixtures. The grain size of the lead particles should preferably be between 80 and 100 microns to preclude the undesirable evaporation effect.

The spraying operation can be carried out with known powder spray guns. But any other applicators operating thermokinetically may also be used to apply metallic or also nonmetallic coatings to a porous rough base.

If the bands, flats or strips to be coated are too wide so that a uniform coating covering the workpiece width can no longer be applied with a single spray applicator, several such applicators can be disposed next to or above each other to assure uniform coating.

To transform or deflect the conical spray jet into a uniform jet width and thickness, a sprinkler head or the like assuring a more favorable coating can be attached to the front of the powder spray nozzle.

The design of this device can be such that two opposite, adjustable spray nozzles provided with holes arranged in a row are used, to which air or an inert gas such as nitrogen or helium or a gas mixture is fed.

An acetylene-oxygen mixture or hydrogen-oxygen mixture can be used as fuel gas for the powder spray device. The hydrogen-oxygen mixture has proven to be better, and yet the acetylene-oxygen mixture can be given preference as fuel gas for reasons of cost.

The spacing of the nozzle from the substrate to be coated should be 210±10 mm because it has been found surprisingly that even small deviations will change the thermal conditions so that the bond becomes substantially worse as the distance is increased, and lead evaporation due to heat reflection occurs as the distance is decreased.

The porous carrier layer is coated continuously in that a stationary spraying device is supplied with a mixture of the suspension alloy components or a pre-alloy powder, and the band or the like to be coated is led past the spraying device.

After the coating operation, the laminated material thus produced is subjected to an additional compression. The compression can be a rolling or isostatic pressing operation. When AlPb coatings are involved, the degree of deformation relative to the overall material thickness should be selected so that the Pb particles experience no stretching. It should therefore be between 5% and 20%, preferably between 11% and 14%. The laminated material thus produced can subsequently be processed into bearing bushings, bearing cups and the like without further operations such as annealing etc. without fear of separation.

However, it is also possible, in connection with continuous coating, to use a broad spray nozzle which permits aluminum and lead to be fed in separately. For the purpose of thorough mixing, the components, being oriented at a certain angle towards each other and discharging from the broad spray nozzle, are made to impinge on each other above the rough base.

If instead of the rough base, the surface receiving the suspension alloy is chosen to be an aluminum surface of aluminum alloy surface with surface activation and grain structure produced by brief heating to a temperature between 450° C. and the melting point of the aluminum or aluminum alloy in an inert atmosphere, the laminated material can be produced generally more cheaply than with the preparation of a rough base, while the application of the suspension alloy can be accomplished as on a rough base, and the adhesive power is practically as good as with the preparation of a rough base.

The aluminum or aluminum alloy surface receiving the suspension alloy that tends to dissociate can be constituted, for example, of aluminum or aluminum-plated material, or aluminum or aluminum alloy only can be used.

The substrate or the substrate plating can consist of pure aluminum, such as Al 99.5 or any aluminum alloy.

The production of aluminum-plated steel has been known for a long time. In producing metallic laminates with lead-containing suspension alloys, the intermediate material such as aluminum or aluminum alloy serves the purpose of obtaining a better bond with the substrate material (German Disclosure reference No. DT-OS 14 00 039). A disadvantage can occur in making the substrates or intermediate sections with an aluminum containing material, because the thermal conditions during the flame spraying of the coating do not break up the oxide film of the base material, and as a consequence the sprayed-on layer under severeconditions can separate, as during subsequent forming operations and under high dynamic loads, leading to the failure of the part. However, according to the present invention it has been found that the oxide film of the Al layer can be destroyed and removed by suitable surface activation through heat and by favorable thermal spray conditions, so that in consequence an excellent laminated material adapted to withstand the specified loads can be produced without further after-treatments such as annealing. The temperatures required for such surface activation or de-oxidation must reach at least 450° C., but they can be just below the melting point of aluminum, so as to cause the destruction and removal of the Al oxide film as required within the scope of the method claimed.

The surface activation through heat can be carried out with all known equipment and apparatus such as electrically or gas-heated continuous furnaces (see FIG. 10), it being advisable to activate preferably in a protective gas atmosphere to avoid the formation of a new oxide film on the surface.

By suitable adjustment of the spraying conditions, preferably employing a reducing atmosphere of the $C_2H_2$-$O_2$ fuel gas mixture, the oxide film of the aluminum-containing base layer is destroyed and removed, and the suspension alloy metal droplets, which appear in their molten state, coat the de-oxidized surface of the aluminum and prevent reformation of any new oxide, thus forming an excellent bond with the heated base layer, which bond is no longer destroyed by any subsequent working, deformation or loading. The suspension alloy, highly plasticized or liquified by the fuel gas and tending to dissociate, can consist for example of an AlPb mixture, the aluminum component of which contains additional alloying elements such as Si, Cu, Fe and/or Mo. Lead as the second component can contain tin as an alloying element. Besides these AlPb powders, an AlPb alloy can be used, containing about 5% to 20%, preferably 8% lead in aluminum. Sn, Si, or Cu can be present as additional alloying elements. The highly heated components of the mechanical AlPb mixture of alloyed powder are those which are transformed into plastic or molten state due to the supply of heat energy. The molten material is finely divided by the carrier gas flow and is carried along by the gas at great velocity. After impinging on the porous intermediate layer which is preheated under a protective gas atmosphere, the finely divided, molten spray particles experience rapid cooling.

Within the scope of the invention, the AlPb mixture or the alloyed powder used for the spraying operation can consist of about 20 percent by weight of lead and 80 percent by weight of aluminum for example.

The present invention is not restricted to this composition only, but can comprise also other mixing ratios and other alloy compositions without fear that the excellent bonding of the coating would suffer, when the spray conditions are changed accordingly. The shape of the particles of the mixture or alloy to be used for thermokinetic plating, within the scope of the invention, should preferably be spherical. Such a spherical particle shape should be given preference over sharp-cornered or elongate particle shapes. The percentage of particles of a shape other than spherical in an aluminum-lead mixture, for instance, should not exceed 20%, if possible.

It is known that a part of the spray material such as aluminum or lead evaporates at the high temperatures prevailing in the flame spray jet because the metallic spray particles are usually present in various sizes. The consequence of these particlesize differences is that the smaller particles heat up faster due to the fact that, as is known, the surface of the particles decreases with the square, while their mass decreases with the third power of their size. Accordingly, smaller particles evaporate faster, becoming even smaller.

It is therefore recommended, within the scope of the invention, to select the aluminum grain size smaller than 60 microns, preferably between 40 and 60 microns when processing AlPb mixtures. The grain size of the lead particles should preferably be between 80 and 100 microns to preclude the undesirable evaporation effect.

The spraying operation can be carried out with known powder spray guns. But any other applicators operating thermokinetically for the application of metallic or also non-metallic coatings may also be used.

If the bands, flats or strips to be coated are too wide so that a uniform coating covering the width of the workpiece can no longer be applied with a single spray applicator, several such applicators may be disposed next to or above each other to assure uniform coating.

To transform or deflect the conical spray jet into a uniform jet width and thickness, a sprinkler head or the like assuring a more favorable coating can be attached to the front of the powder spray nozzle. The design of this device can be such that two opposite, adjustable spray nozzles provided with holes arranged in a row are used, to which air of an inert gas such as nitrogen or helium or a gas mixture is fed.

An acetylene-oxygen mixture or hydrogen-oxygen mixture can be used as fuel gas for the powder spray device. The hydrogen-oxygen mixture has proven to be better, and yet the acetylene-oxygen mixture can be given preference for economic reasons.

The nozzle should be spaced from the base material to be coated, by 170 mm±10 mm for the AlPb powder mixture as well as the AlPb alloy powder. Even small deviations from this distance lead to considerable changes in the thermal conditions. The invention claimed insures optimal bonding of the sprayed layer to a substrate preheated in a protective gas atmosphere, which destroys the Al oxide film due to empirically determined surface activation and optimal spraying conditions.

The substrate material is coated continuously, in that the stationary spraying device is supplied with a mixture of the suspension components of the suspension alloy, and in that the band to be coated, preheated in a protective gas atmosphere, is led past the spraying device.

Figure 8:
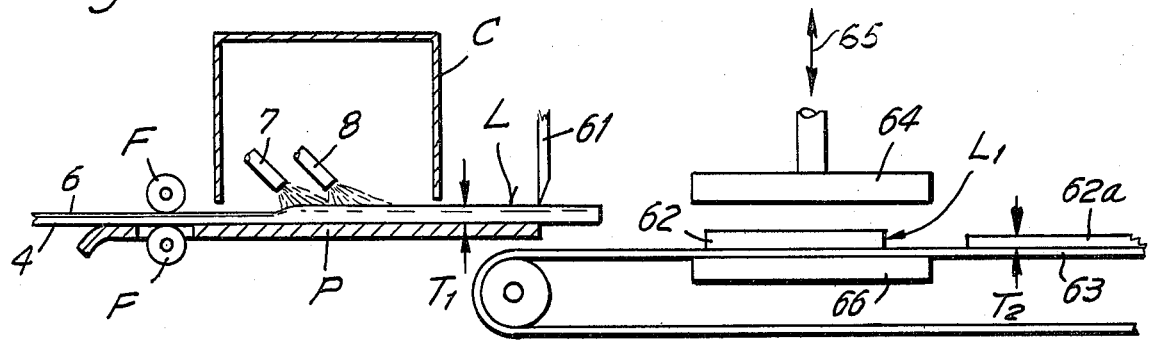
FIG. 8 is a view like FIG. 6, showing yet another pressure device.

FIGS. 6, 7 and 8 show other forms of the apparatus provided by the invention, differing somewhat from the showing of FIGS. 4 and 5. Similar reference characters indicate parts already described above.

In FIG. 6 the letter S indicates a known SANDVIK conveyor machine, which has been provided with a continuous compression device, said machine being disposed at the discharge end of the platform P. The machine S has a pair of transporting belts 41, 41a preferably made of stainless steel and adapted to receive between them the composite laminate in the form of the strip or band L. In the central portion Y, the machine S is provided with pressure means which coact with the back surfaces of the belts 41, 41a. This pressure means comprises a pair of link conveyors 42, 42a, which press against the back surfaces of the belts 41, 41a isostatically. The relative positioning of the conveyors 42, 42a is adjustable, to compress the strip or band L from the thickness $T_1$ to the thickness $T_2$.

FIG. 7 shows an apparatus wherein static pressures can be applied to the laminate L. Again, similar numerals or letters designate parts already described. Compared with FIG. 6, the SANDVIK machine S is replaced by a pair of pressing plates 51, 51a located respectively above and below the laminate L. The plates are capable of simultaneous compound or four-directional movement as indicated by the arrows 52, 52a. When the plates are brought together and compress the laminate L, they also travel with the laminate during the application of the pressure. After a travel which is somewhat less than their lengths, the plates separate and return to a starting position in preparation for the succeeding pressing operation wherein an overlap now occurs due to the shorter travel. The laminate is thus pressed in steps, equalling in effect a continuous pressing action.

FIG. 8 shows still another apparatus, wherein the laminate L is cut by a knife 61 into short lengths or plates $L_1$, two such plates being specifically designated 62, 62a. The plates $L_1$ drop onto a transporting belt 63 preferably of stainless steel, which runs through a pressing machine having an upper plate 64 above the belt 63. The plate 64 has opposite vertical movements as indicated by the arrows 65. A stationary plate 66 is arranged below the belt 63, which latter is driven stepwise with a running speed that is much higher than the speed of the laminate L as fed by the rollers F. The rollers F can be halted during the cutting by the knife 61. The cut-off plates $L_1$ are periodically brought between the pressing plates 64, 66 which reduce the thickness during the stationary intervals of the belt 63. The laminates $L_1$ are thus statically compressed, in an operation which is essentially continuous in nature.

Figure 9:
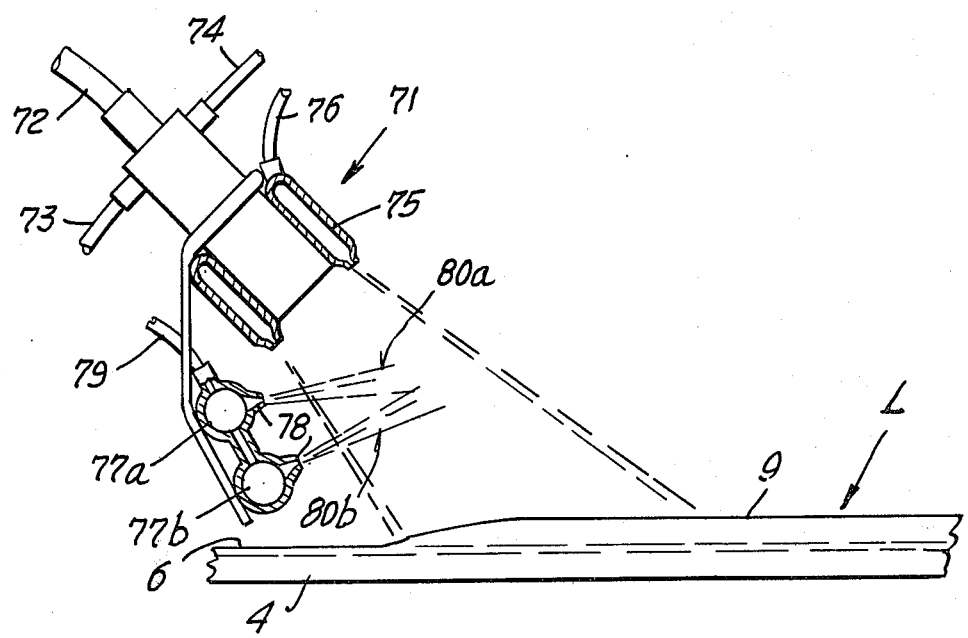
FIG. 9 is a detail of a spray gun nozzle, shown in side elevation.

Details of a spray gun 71 of well-known construction are shown in FIG. 9. A material inlet hose 72 carries pulverized metallic material, which is pneumatically transported into the gun. The gun has a gas inlet 73 to supply hydrogen or acetylene, and an inlet 74 for oxygen.

At its outlet end the gun 71 has a ring-like nozzle 75 with a gas inlet 76. The nozzle 75 surrounds the flame or spraying cone and limits the same.

Usually the spray guns produce a dense inner plasma cone, where most of the material is deposited whereas the rim portions of the cone contain relatively little material. To overcome this, there is provided an additional spary disturber or distributor called herein a "sprinkler head". This distributor comprises a pair of tubes 77a, 77b each having a row of nozzles 78. The tubes 77a, 77b are supplied with gas pressure from a hose 79. The gas streams 80a, 80b from the nozzles 78 cross each other substantially in the central part of the flame from the gun 71, and provide a distribution of material within the area defined by the gas cone. It goes without saying that an embodiment variation can also consist in that strip sections or flats, preheated in a protective gas atmosphere, are coated in the manner described earlier.

What is claimed is:

1. A high bond-strength bearing laminate comprising, in combination:
   (a) a substrate member having on one side an interface on which there has been thermokinetically sprayed a metallic suspension alloy to form a solid bearing coating,
   (b) said coating comprising a solid suspension of different metallic components which are chemically dissociated in the coating with respect to each other,
   (c) said interface being disposed between the said substrate member and the said coating, and having a porous surface on a permanently roughened zone characterized by interstices located in that portion thereof to which the coating has been applied,
   (d) said coating having a substantially solid layer structure caused by its being pressed into intimate contact with the said porous surface of said roughened zone by means of mechanical force which reduces the thickness of the laminate, said force being applied simultaneously to the said substrate member and coating and causing small metallic particles of the coating to enter the pores of, and to more intimately contact the interface having the interstices of the roughened zone.

2. A bearing laminate as in claim 1, wherein:
   (a) the other side of the substrate member has an interface and a metallic alloy coating as characterized in sub-paragraphs (a), (b), (c) and (d) of claim 1.

3. A bearing laminate as in claim 1, wherein:
   (a) the substrate member consists of one or more of the metals aluminum, copper, tin, iron and the alloys thereof, and low-carbon steel.

4. A bearing laminate as in claim 1, wherein:
   (a) the said one side of the substrate member is copper plated.

5. A bearing laminate as in claim 1, wherein:
   (a) the substrate member comprises a porous sinter skeleton consisting of a copper-containing material.

6. A bearing laminate as in claim 5, wherein:
   (a) the sinter skeleton is constituted of stannous bronze.

7. A bearing laminate as in claim 5, wherein:
   (a) the interface is formed of essentially spherical particles which are sintered to the substrate member.

8. A bearing laminate as in claim 5, wherein:
   (a) the substrate member comprises a self-supporting structure.

9. A bearing laminate as in claim 1, wherein:
   (a) the coating comprises a slide bearing substance containing aluminum material and lead material.

10. A bearing laminate as in claim 9, wherein:
    (a) the coating contains better than 75% aluminum material by weight and less than 25% lead material by weight.

11. A bearing laminate as in claim 9, wherein:
    (a) the aluminum material contains Si, Cu, Mg or Fe, and the lead material contains Sn, Sb or Li.

12. A bearing laminate as in claim 1, wherein:
    (a) the coating is a powdered mixture that is thermokinetically plated on the interface.

13. A bearing laminate as in claim 1, wherein:
    (a) the metallic suspension alloy comprises a mixture of aluminum particles and lead particles,
    (b) the shapes of the particles of the mixture being spherical,
    (c) the grain size of the aluminum particles being smaller than the grain size of the lead particles.

14. A bearing laminate as in claim 13, wherein:
    (a) the grain size of the aluminum particles is between 40 and 60 microns, and the grain size of the lead particles is between 80 and 100 microns.

15. A bearing laminate as in claim 1, wherein:
    (a) the substrate member is formed of a material selected from the group consisting of copper, zinc, iron, low-carbon steel and the alloys thereof.

16. A high bond-strength bearing laminate comprising, in combination:
    (a) a substrate member having on one side an interface on which there has been thermokinetically sprayed a metallic suspension alloy to form a solid bearing coating,
    (b) said coating comprising a solid suspension of different metallic components which are chemically dissociated in the coating with respect to each other,
    (c) said interface being disposed between said substrate member and the said coating, and having a porous surface which is characterized by a de-oxidized zone containing aluminum which has a de-oxidized activation produced by its being subjected to heat at a temperature above 450° C. and below the melting point of the aluminum while in the absence of oxygen,
    (d) said coating having a substantially solid layer structure caused by its being pressed against said de-oxidized zone by means of mechanical force which reduces the thickness of the laminate, said force being applied simultaneously to the said substrate member and coating and causing small metallic particles of the coating to enter the pores of, and to be bonded to the porous surface of the de-oxidized zone of the interface.

17. A bearing laminate as in claim 16, wherein:
    (a) the other side of the substrate member has an interface and a metallic alloy coating as characterized in sub-paragraphs (a), (b), (c) and (d) of claim 16.

18. A bearing laminate as in claim 16, wherein:
    (a) the substrate member consists of one or more of the metals aluminum, copper, tin, iron and the alloys thereof, and low-carbon steel.

19. A bearing laminate as in claim 16, wherein:
    (a) the interface between the substrate member and the coating comprises an aluminum material.

20. A bearing laminate as in claim 16, wherein:
    (a) the said one side of the substrate member is plated with an aluminum material to constitute said de-oxidized zone.

21. A bearing laminate as in claim 16, wherein:
    (a) the substrate member comprises an aluminum material.

22. A bearing laminate as in claim 16, wherein:
    (a) the coating comprises a slide bearing substance containing aluminum material and lead material.

23. A bearing laminate as in claim 22, wherein:
    (a) the coating contains better than 75% aluminum material by weight and less than 25% lead material by weight.

24. A bearing laminate as in claim 16, wherein:
    (a) the thickness of the aluminum of the interface ranges from 0.05 mm to 0.3 mm.

* * * * *